BURTON CUTLER
INVENTOR.

BY William F. O'Neil
AGENT

July 20, 1965

B. CUTLER 3,196,434

RADAR SYSTEM WITH IMPROVED AREA TYPE MOVING TARGET INDICATOR

Filed June 14, 1960

BURTON CUTLER
INVENTOR.

BY William T. O'Neil
AGENT

3,196,434
RADAR SYSTEM WITH IMPROVED AREA TYPE MOVING TARGET INDICATOR
Burton Cutler, Los Angeles, Calif., assignor, by mesne assignments, to International Telephone and Telegraph Corporation, New York, N.Y., a corporation of Maryland
Filed June 14, 1960, Ser. No. 36,011
10 Claims. (Cl. 343—7.7)

This invention relates to radar systems and more particularly to radar systems of the moving target indicator type.

In the prior art, moving target indicating systems have been of two generic types, the "coherent" type MTI (moving target indicator) and the "non-coherent" type. The general purpose of any MTI system, whether coherent or non-coherent is the effective presentation of signals corresponding to moving targets to the exclusion of, or with discrimination against, targets which do not move. Thus, large land masses such as mountains and other fixed objects which give radar reflections (i.e., signal returns) to ordinary radar sets may be discriminated against in the moving target indicator radar system, thereby reducing confusing information and affording other distinct and well known advantages to the radar operator. Considerable prior art description establishing the background and relating to MTI radar system in general appears in Chapter 16 of the Radiation Laboratory Series, vol. 1, (First Edition, third impression), published in 1947 by McGraw-Hill Book Company of New York.

The instant invention concerns Area MTI which is a form of non-coherent MTI system. The use of the term "Area" is based on the concept of fixed target cancellation on the basis of a video comparison over a period of time spanning many radar transmitted pulses; whereas coherent systems as explained in the above mentioned vol. 1, Chapter 16, of the Radiation Laboratory Series, effect an instantaneous type of signal cancellation (i.e., cancellation between echoes from one repetition interval to the next).

Although a more complete discussion of the general concepts of Area MTI systems and their relation to the instant invention will be undertaken below, it may be stated here in general that prior art Area MTI systems suffer from two significant disadvantages. First, it is pointed out that whenever cancellation is effected by direct comparison of video waveforms, it is obvious that good cancellation depends on good bandwidth in all components of the system including good resolution in the storage tube. Any deterioration of waveforms caused by delays, phase distortion, etc., tends to result in generation of vestigial video signals in lieu of complete cancellation.

The second disadvantage of prior art MTI (including prior art Area MTI) stems from the fact that the "subclutter" visibility in an Area MTI system is very much dependent upon the amplitude dynamic range (i.e., output response as a function of input signal) in the system as a whole. Since large block signals particularly at close range tend to give saturation signals to the radar receiver, the presence of a moving target at a range coincidental with such a fixed object tends to be obscured since there is no dynamic range remaining in the receiving system to accommodate the signal return from the said moving target. The use of variable receiver sensitivity as a function of range, sometimes called STC (Sensitivity Time Constant) does not eliminate this problem since large fixed targets and small moving targets at comparable ranges may reflect vastly different amounts of energy.

In consideration of these disadvantages of the prior art, the principal objects of the instant invention follow:

It is an object of this invention to provide an area MTI system which has improved "sub-clutter" visibility.

It is a further object of this invention to provide an area MTI system which requires less system bandwidth and storage tube resolution than that required by prior art area MTI systems.

It is a further object of this invention to provide MTI cancellation in an Area MTI system which is substantially free of vestigial video, thereby producing more effective cancellation than heretofore obtainable.

It is also an object of the present invention to produce an Area MTI system which does not require a high order of system stability, thereby facilitating simple attachment to existing radar systems.

It is yet another object of the present invention to produce an Area MTI system which is not critically dependent upon specific radar system parameters for adequate performance.

Other objects and achievements of this invention will be apparent as the further description and claims are studied.

Figure 1:
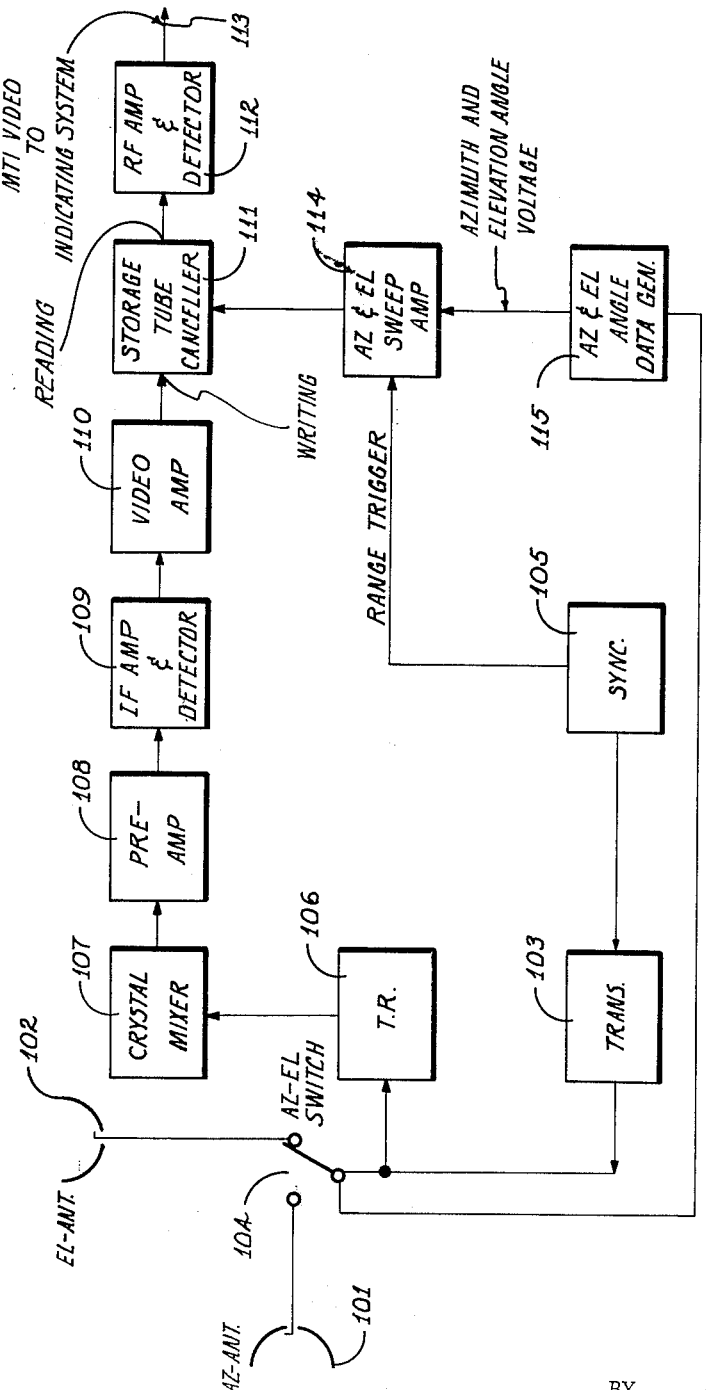
FIGURE 1 shows a simplified block diagram of a typical Area MTI system of a prior art type suitable for the GCA application.

Although it should be made clear that the instant invention is readily applicable to any scanning radar, as is also fundamentally the case with most MTI systems, the discussion following will be directed toward one particular scanning radar, namely, GCA (Ground Controlled Approach). This is done because GCA is a well known scanning radar equipment in which the need for MTI is well recognized, and for which the improved Area MTI in accordance with the present invention is particularly advantageous. For the reader's information, U.S. Patent No. 2,555,101, issued February 25, 1944, to Alveraz is an excellent reference describing the elements of a GCA system (without MTI of any type).

Before embarking on a detailed description of the present invention, it is thought to be desirable to discuss the prior art and the environment of the invention in some detail.

The GCA (Ground Controlled Approach) problem arises because of the need for controlling the flight of aircraft during periods of reduced visibility, specifically during the approach and landing. The function of the GCA equipment is to aid in the establishment of a precision glide path in the final phases of approach and of landing of aircraft. This may be well accomplished by means of a highly accurate (Ground Controlled Approach) radar, in conjunction with a communications link between the ground equipment and the aircraft.

One of the most serious problems associated with GCA precision landing is that of ground clutter. The smaller the effective radar target area of the approaching aircraft, the more severe the ground clutter problem. This effect is emphasized because the aircraft is seen virtually head-on during GCA operations, so that the radar receives echo power corresponding to the minimum echoing area of the plane. In the past, one technique for reducing the visible effects of clutter has been to reduce system gain in the final approach. This technique is based on the echoing area of the target being comparable to the echoing area of the clutter. However, as planes become more advanced in design, and echoing areas tend to fall consistently as low as 0.2 to about 2 square meters, head-on, this particular technique is not particularly useful. Furthermore, the echoing area of the plane is not constant. Polar patterns taken of various types of aircraft indicate that echo signal strength under these conditions must be expected to vary 30 db to 40 db, thereby producing signal peaks and nulls during any given approach. For propeller-driven aircraft, the nulls tend to be filled-in somewhat by propeller modulation; however, for jet aircraft the beneficial effect of this "prop modulation" is absent. From this discussion one realizes the need to handle the clutter problem directly for the GCA applications, by reducing the clutter signal return relative to the signal return. For some sites an MTI range on the order of 3 miles from touchdown is adequate, however, many sites present a sufficiently severe problem to dictate GCA MTI ranges as much as 6 to 10 miles. The areas of solution to this problem are discussed in the following. Although coherent MTI systems as described in U.S. Patent 2,717,377 can and have been used in GCA equipment, the added complication and the lower order of resultant stability and reliability are significantly disadventageous, however.

The GCA clutter problem is related to the nature of the site and is frequently aggravated by the existence of antenna side lobes. The types of antennas necessitated by the rapid scan operation do not lend themselves to the ordinary techniques for effecting carefully controlled side lobe characteristics.

Having realized that some form of MTI is required to handle the clutter problem, the question arises as to the most practical form that this MTI should take for radar systems such as GCA. Since many "hits" per beamwidth are desired and only moderate ranges are required, high scanning rates and high pulse repetition rates (i.e., high data rates) naturally follow.

Any MTI system chosen for the GCA application presents its own unique design problems. The coherent type (line-by-line) MTI referred to previously, although capable of good sub-clutter visibility and general performance, poses great technical complication of design and consequently is an expensive MTI. Great care is necessary to obtain the necessary stability of the radar transmitter, receiver local oscillator, and the various video and pulse handling circuits. Klystron and other local oscillators tend to exhibit both short and long term instabilities, and the clutter instability problem due to the high scanning rates and the limited number of "hits" per beamwidth become difficult problems in the coherent MTI application.

Furthermore, and often of primary importance, there is the matter of "blind speeds," a phenomenon peculiar to line-by-line MTI systems. (See Sec. 16.9 of Radar System Engineering, by Ridenour, volume 1, Radiation Laboratory Series, published by McGraw-Hill, New York, New York.) It is often difficult to reconcile "blind speeds" with a variety of landing speeds where the MTI radar must handle a variety of approaching aircraft ranging from light planes to jet fighters.

It will be noted that Area MTI (which is not a line-by-line system) is not only capable of passing moving targets exhibiting diverse velocities, but will do so without significant reduction in visibility. Furthermore, Area MTI, which is a non-coherent MTI system, has the intrinsic capability of "clutter gating" to maintain maximum visibility of a moving target in the clear. Coherent systems, on the other hand, inherently deteriorate targets in the clear by some irreducible minimum amount.

In view of these considerations, Area MTI may be considered to be a satisfactory technique for use with GCA as well as the general radar case. After the following discussion of prior art Area MTI system, the background of the instant invention will be better understood.

The principle of Area MTI as exemplified in one prior art equipment involves the utilization of the properties of the barrier grid storage tube as a differencing device. The mechanism includes recording, over a period of several radar scans, a charge pattern on the dielectric surface of the storage tube which is a replica of the particular area being scanned by the radar. Moving targets are resolved, then, by virtue of their spatial change in position while fixed radar return is cancelled after equilibrium is reached due to the lack of difference information on successive scans. The charge pattern may resemble the radar indicator CRT display since the storage tube is swept in a similar manner.

This particlar prior art Area MTI system is delineated in considerable detail in the final engineering report entitled "Area MTI System for Radar Set AN/FPN-16," prepared for the Department of the Air Force under Contract No. AF 30(602)-784, by the Radio Corporation of America, Moorestown, New Jersey. A copy of this unclassified report is currently available from the Armed Services Technical Information Agency, Document Service Center, Knott Building, Dayton 2, Ohio.

The radar system shown in FIGURE 1 serves to illustrate generally certain components of a typical GCA system in which Area MTI is incorporated. The particular Area MTI system illustrated in FIGURE 1 is the basic system described in the above referenced final engineering report and as previously mentioned, uses a barrier grid storage tube as a differencing device. FIGURE 1 shows the conventional azimuth antenna 101 and elevation antenna 102 which, on a time sharing basis, scan the approach zone to an aircraft landing field for purposes of transmitting pulsed energy and receiving resultant echoes from aircraft in the approach zone. For that purpose, pulsed energy from the transmitter 103 is transferred through the radio frequency azimuth and elevation (Az-El) switch 104 to antenna 101 and antenna 102 alternately. For the purpose of initiating energy pulses in timed relationship, synchronizing pulses are transferred to transmitter 103 from the synchronizer 105.

The resulting echoes (reflected signals) received on the azimuth antenna 101 or elevation antenna 102, as the case may be at any one particular time, are transferred through the conventional transmit-receive (TR) switch 106 to the crystal mixer 107 of a superheterodyne type of radar receiver, such crystal serving to transform the received echo signals to a predetermined intermediate frequency, as is well known in the art. Such signals of intermediate frequency are in conventional manner amplified in the preamplifier 108 and are further amplified, then amplitude detected by the intermediate frequency (IF) amplifier and detctor 109, The video output of detector 109 is amplified to a predetermined value by video amplifier 110. Up to this point the transmit-receive system briefly described is typical of the average GCA system and is conventional in all respects. As a matter of fact, using only one antenna and deleting the Az-El switch 104, the transmit-receive system to this point is typical of most surveillance type radar systems.

Continuing the description of FIGURE 1, in a radar system not employing any version of an MTI system, the output of the video amplifier 110 is fed to a display indicating system wherein a cathode ray tube is used in displaying the video signals. In the prior art Area MTI system depicted in FIGURE 1, the video from the video amplifier 110 is first routed to the storage tube canceller 111 instead of the display system. After due processing within the storage tube, the video is fed to the display system via the output amplifier 112.

The storage tube canceller 111 includes a barrier-grid storage tube of the Radichon type and an R-F signal separation circuit permitting simultaneous writing of the video input signal and reading of the desired output difference signal. This R-F signal separation technique, as adapted to the Radichon instrumentation, is explained in detail in the RCA Review (a technical journal), volume VI, published June 1955 by the Radio Corporation of America, Princeton, New Jersey. The R-F amplifier and detector 112 which receives the R-F difference signal from the storage tube canceller 111, consists of a tuned R-F amplifier, responsive to the frequency of the R-F oscillator used in the signal separation circuit and an amplitude detector. The output of the R-F amplifier and detector 112 is fed to the indicating system via line 113. Thus, video differencing is effected continuously as new information is being made available to the storage tube. Any difference between this "new video" and that already stored, is the moving target information and is extracted via this radio frequency signal separation technique and is converted to video by the detector 112. Synchronizer 105, beside supplying triggers to the transmitter, triggers the azimuth and elevation sweep amplifier 114 at a predetermined rate wherein range gates and sweeps are generated and sent to the deflecting electrodes of the storage tube canceller. The azimuth and elevation angle data generator 115 provides analog azimuth and elevation antenna scanning information on a time shared basis. This angle information is used to modulate horizontal and vertical components of the storage tube sweeps such that scan of the storage tube surface resembling the cathode ray tube scan in the indicator is effected. More specifically, the sweep components thus generated in sweep amplifier 114 provide the storage tube with a type B scan whose sweep in the range component direction is synchronized with the radar repetition frequency and whose azimuth and elevation sweep is instantaneously synchronized with the angular position of the corresponding scanning antenna beam.

In the above type of Area MTI operation, only the difference signal is thus observed at the output of the R-F amplifier and detector 112, i.e., a target which is continuously changing in time phase such as a moving target. The barrier grid storage tube used in this particular type of Area MTI system thus effectively has the ability (in effect) to cancel targets of constant amplitude and phase (position in range and angle) internally.

The internal signal cancellation process in the barrier grid storage tube is explained in the aforesaid reference ("Area MTI System for Radar Set AN/FPN-16"). A brief summary of this phenomenon follows, in order that the reader may have a clear understanding of the prior Area MTI system just discussed, and thus be prepared to fully appreciate the difference and the advantages of the present invention.

When a signal is impressed upon the plate of a scanned barrier grid storage tube, the beam deposits on the insulating target a charge pattern, varying in intensity, in accordance with the amplitude variations of the signal. If the surface is again scanned over the same path with no signal impressed, the beam will remove the charge pattern, thus reading off a signal which is in polarity a mirror image of the original signal. Both during the writing and the reading, the signal will appear on the collector as a modulation of the secondary beam. In this operation, the tube has acted as a memory device, storing and subsequently reproducing a signal. If, however, the same signal is impressed upon the tube on each successive scan, the beam will already have deposited the charge pattern necessary to match this signal variation. Therefore, that area under the beam at any given time is instantaneously at equilibrium potential. No charge will be deposited on the target on succeeding scans, so that the secondary beam will be constant and unmodulated. Thus no signal will appear on the collector unless a variation in the input signal requires deposition of charge by the beam.

The above type of Area MTI is based on the ability of the particular type storage tube to act as a combined memory and subtraction device whereby stationary targets being of constant phase and amplitude are cancelled and during successive scans only the difference appears at the collector of the storage tube, said difference being that target information changed in phase and/or amplitude since the previous scan such as an aircraft or moving vehicle.

Several practical limitations exist with respect to this prior art type of Area MTI system because the maximum resolution capability of the storage tube restricts the Area MTI to a limited portion of the scanned radar area. Since practical storage tubes have a limited number of resolution elements in any direction across the storage surface, the greater the range which is accommodated by the storage area, the lower the number of resolution elements per unit of range. Consequently, prior art Area MTI systems, in view of their need for good video fidelity, are unable to obtain good performance over long range intervals. The cancellation of a fixed target return is also limited fundamentally in prior art Area MTI by the finite spot size of the storage tube electron beam since this too relates to the fidelity with which charge pattern storage can be effected. In this particular Area MTI system discussed in the prior art report noted above, the MTI sector was intentionally limited by a range gating scheme to a range of three miles.

It will be realized from the foregoing discussion, that existing (prior art) Area MTI systems employing storage tubes are limited, due to the resolution capabilities of storage tubes.

In view of the above, an Area MTI system, according to the present invention, utilizing the properties of a storage tube without suffering the resolution limitation of the prior art, constitutes an important advance over the prior art. As an example, relative to the previously mentioned GCA system, a 10 mile precision Area MTI system is readily obtainable using storage devices capable of only a relatively low order of resolution.

Figure 2:
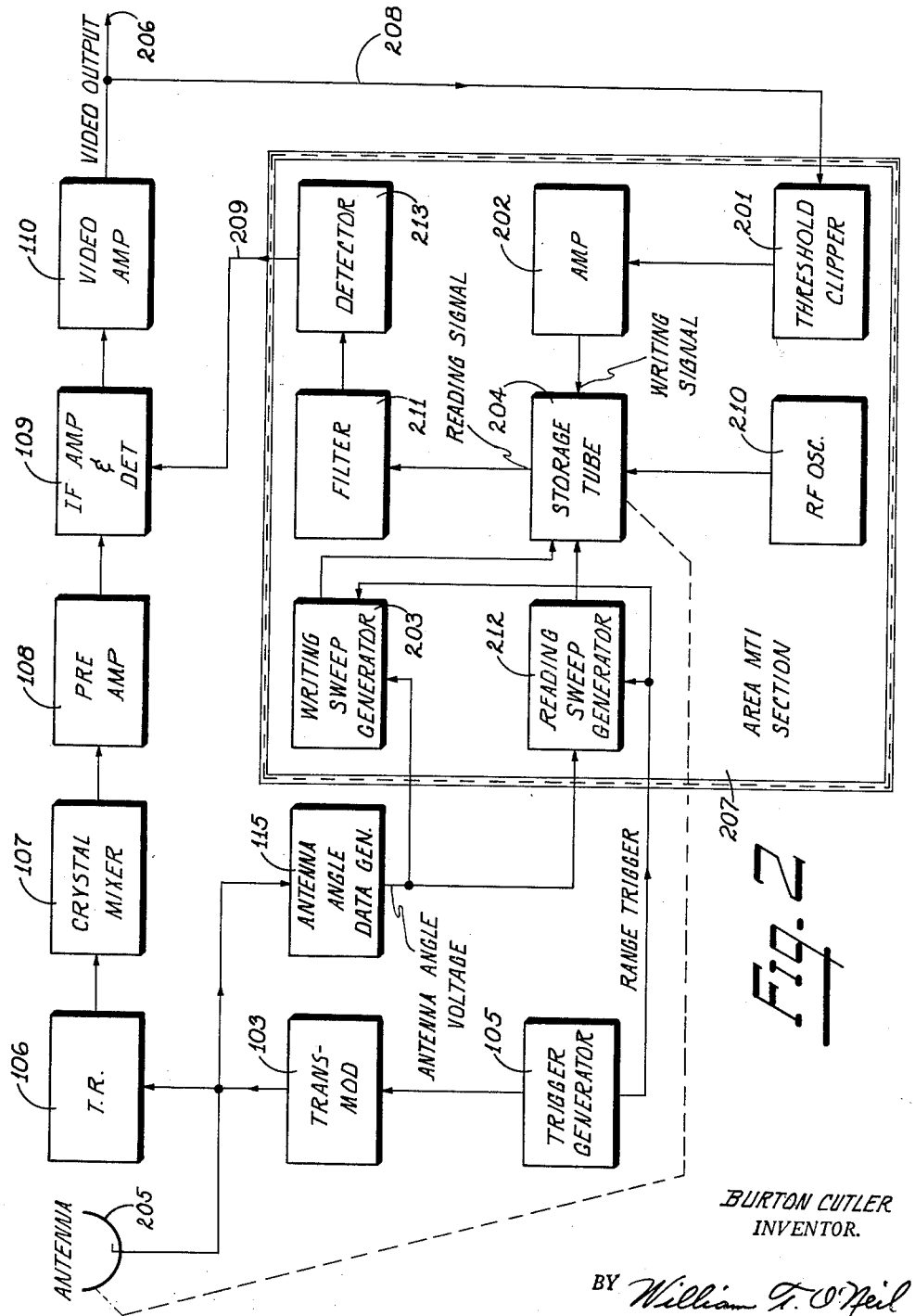
FIGURE 2 illustrates a system for implementing an improved Area MTI according to the present invention.

Referring now to FIGURE 2, an MTI system in accordance with the instant invention is shown. The transmitter-modulator 103, trigger generator 105, TR 106, crystal mixes 107, IF preamplifier 108, IF amplifier and detector 109 and video amplifier 110 are typical for an average system configuration of a "normal" radar set, and will be recognized as a duplication in part of FIGURE 1, except for the accommodation of a signal from 213, to be explained later. Antenna 205, of course, is also typical of the average microwave antenna array, such as the azimuth or elevation antenna array referred to in FIGURE 1, 101 and 102, respectively.

It will be noted upon close examination of FIGURE 2 that a feedback path from video output 206 reaches the IF amplifier 109 via threshold clipper 201, amplifier 202, storage tube 204, filter 211 and detector 213. These five individually simple units, plus writing and reading sweep generators 203 and 212, when incorporated into a "normal" radar set, are capable of providing the radar set with Area MTI type operation by attachment, and modification of IF amplifier and detector 109. This unique configuration is capable of automatically regulating the gain of the IF stages of a radar receiver at a video rate and in accordance with selected targets, as will be explained. A key fact relating to the function of the present invention as an MTI system is the fact that the IF amplifier is substantially only affected by targets having a constant range relationship over a period of time spanning a number of radar transmitted pulses, i.e., the controlled gain of the IF amplifier is a function of the return amplitude of targets of constant range. A charging or "learning" time constant of at least several scan cycles is relied upon to substantially prevent the storage of targets which change position (i.e., move) between scans. If a moving target (aircraft) is within the perimeter of a fixed target, then the incident energy received from the moving target will add to the incident energy from the ground target at the range of coincidence. Therefore, with the reduction of gain thus imposed by ground target feedback of stored video during that interval of time in which the ground target is received, a moving target within said perimeter will be able to stand above the ground signal because it represents reflected energy in excess of the corresponding stored signal used for gain control purposes. The receiving system, moreover, will obviously never be saturated by massive fixed targets, thus eliminating one of the principle factors limiting sub-clutter visibility in any MTI system.

Referring again to the drawings, a "normal" radar system video pulse train at output 206 for an arbitrary direction of scan may be seen in FIGURE 3(a). In this example of a typical range period, only fixed targets are shown. It is assumed at this time that the Area MTI section 207 within the double lines forming a "black box" addition to a radar set is not present. Fixed targets 301 and 303 are at saturation level and fixed target 302 is another large, but not saturating, target. Any moving target within the perimeter of the ground targets, represented by the signals 301, 302, and 303 in FIGURE 3(a), will not be discernible. The stationary targets being at or near maximum (saturation) amplitude, tend to "swamp" out the moving target when it is within the perimeter of any of the said stationary targets as viewed on a PPI presentation.

Now assume that the Area MTI section 207 is incorporated into the otherwise relatively simple radar set depicted in FIGURE 2. The video output 206 is now also routed to the threshold clipper 201 via line 208. The threshold clipper 201 acts as a biased clipper which passes video above level 313 and not that between 304 and 313. Thus, only that level which exceeds the new threshold level will be stored by storage tube 204. The output of the threshold clipper 201, the base level of which is now as illustrated by dotted line 313, is fed to amplifier 202. The gain setting of amplifier 202 determines how much of the video above this threshold level will be stored on any given scan. This is because the storage surface response, like that of any cathode ray device, requires finite build-up time, therefore, recording or charging signal amplitude produces an effective storage build-up time constantly inversely proportional to said recording or charging signal amplitude. It will be seen that storage tube 204 will then more or less gradually build up and retain a mosaic of all fixed targets as it is continuously supplied with video data via amplifier 202. FIGURE 3(b) is typical of the storage tube output appearing on the AGC signal line 209. The AGC pulses 305, 306, and 307, corresponding to signals 301, 302, and 303 are of negative polarity to control the gain of the IF amplifier 109, assuming that an IF amplifier adaptable to pulsed gain control, as for example, the IF amplifier shown in U.S. Patent 2,751,587, is used at 109. The base or quiescent level 308 is such that during the interval between control pulses, the IF amplifier is at nominal full gain. The time interval between the first application of any signal input to the storage tube 204 and the growth of a signal output at 209 sufficient to control the gain of the IF amplifier 109 is, in view of the storage tube charging (learning) time constant discussed above, dependent upon the gain setting of amplifier 202. This interval of time in a representative case, will be about 5 to 30 seconds, depending on the said gain setting of the amplifier 202, controlling the input to the storage tube. It is of great importance that, due to this 5 to 30 second learning delay, moving targets will not persist in any one spot long enough to build up a charge pattern on the target surface of the storage tube. Therefore, no AGC signal corresponding to moving targets such as 311, will be derived from the storage tube 204 and no substantial effect on moving targets will be evident at output 206. On the other hand, a video target, the range of which is approximately constant from one scan period to the next, will continuously add to the original charge pattern on the target surface of the storage tube and will, during the "learning" period, build up a charge pattern whereby the charge is sufficient to obtain a signal output that will affect the gain of the IF amplifier. Once a gain control signal, such as 305, begins to build up, the corresponding signal 301 begins to decline in amplitude. The build-up impetus into 204 is thus reduced, and a degenerative cycle begins and results in the establishment of an equilibrium condition with respect to any given signal in the manner to be expected in any inverse feedback arrangement. Note that in FIGURE 3(c), residual signals 312, 309, and 310 corresponding respectively to 301, 302, and 303 are shown below the average "grass" level.

Figure 3:
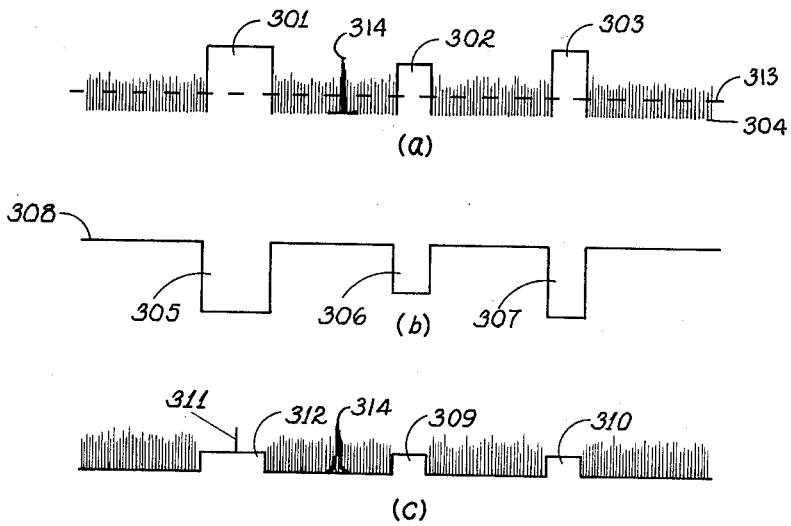
FIGURE 3(a) illustrates a typical video waveform as may be expected from detection of the output of a radar receiver I.F. strip showing typical fixed target pulses mingled with a background of noise.
FIGURE 3(b) shows a typical fixed target pattern as might be present as a visible or charge pattern on a storage tube of some suitable type as associated with the present invention.
FIGURE 3(c) shows a video waveform similar to FIGURE 3 except that fixed target pulses have been substantially removed in accordance with the present invention.

It will be noted that two moving target signals, 311 and 314, are shown in FIGURE 3. Target 311 does not show in FIGURE 3(a) because it is completely enveloped within the saturated fixed signal 301. On FIGURE 3(c), however, the moving target 311 "rides" above 312 in accordance with the previously explained operational principles of the present invention. Target 314, being in the clear, is substantially the same in FIGURE 3(c) as in 3(a).

The amplitude of residual signals 309, 310, and 312 is illustrated for an arbitrary setting of the video threshold bias represented by 313. Obviously, the higher the 313 level is set (less video passed to storage), the higher the 309, 310, and 312 residual signals will be in FIGURE 3(c). Conversely, an adjustment of 313 close to the zero reference video level 304 admits more noise to storage and therefore, some empirically determined compromise in the adjustment of this threshold will be necessary.

It is of considerable importance that the leading edge and trailing edges of the AGC signals derived from the storage tube 204 output and shown in FIGURE 3(b) tend to bracket the corresponding video signals shown in FIGURE 3(a). This phenomenon is due to a certain amount of blur on the stored signal edges. In any storage tube, the contrast of the display depends upon the characteristics of the target surface and the pertinent electron optics. In the present invention, some blur of a stored signal will make the output of the storage tube corresponding to any stored signal block appear at read-out to begin slightly ahead of the corresponding leading edge of the read-in signal and terminate correspondingly late. Thus, inherent limitations in respect to storage tube surface granularity and in the sharpness of focus of the electron beam are actually of benefit in the arrangement of the present invention, since thereby vestigial signals due to slight inherent delays and circuit infidelities are eliminated.

Concerning the choice of a storage tube for the present invention, it has been determined that the designer has considerable choice. A handbook, entitled "Storage Tubes and Their Basic Principles," by Knoll and Kazan, published by John Wiley and Sons, Inc., New York, New York, discusses in considerable detail various types of storage tubes. In this publication, several types of storage tubes capable of simultaneous reading and writing are discussed in pages 53 through 61. Included among the various types discussed is the graphechon type storage tube which is likely to be the preferred type for most variations of the instrumentation of the present invention.

As has been previously explained, the storage tube target surface is scanned much in the same manner as the surface of the typical cathode ray tube used in radar indicating systems, i.e., the storage tube is provided with angular and range components, wherein the range sweep is synchronized with the radar repetition frequency and the azimuth and/or elevation angular sweep is instantaneously and continuously the analog of the angular position of the scanning antenna. In the case of a dual gun storage tube, such as the graphechon, each gun must be provided with such sweep components. In the present invention the sweep to the writing and reading guns is provided by the writing sweep generator 203 and reading sweep generator 212 (see FIGURE 2). Sweep generators 203 and 212 are triggered by the system trigger generator 105, thus the start of the range sweep is synchronized with the radar repetition frequency. The angle sweep analog to control each sweep generator is derived from the antenna angle data generator 115.

When a storage tube is employed for writing and reading simultaneously, as in the case of the present invention, it is necessary to prevent the writing beam current modulation from generating a signal in the output. This is accomplished by intensity modulating the reading beam at a frequency well above the maximum frequency contained in the writing signal.

In the instant invention, the reading beam is intensity modulated by R-F oscillator 210, the frequency of which is, for example, approximately 30 megacycles. As a result, the desired output appears as amplitude modulated 30 megacycle signal which is passed by filter 211. The lower frequency components produced by the writing beam are attenuated by the action of the said filter 211. This 30 megacycle amplitude modulated signal, the reading signal, is next fed to detector 213. This R-F signal separation scheme is a technique described in the literature for conveniently extracting an output signal without "cross-talk" from simultaneous writing. The detected output of the detector 213 is the desired reading signal, which is then ready to be fed in proper polarity to IF amplifier 109 as an AGC signal via line 209.

Figure 4:
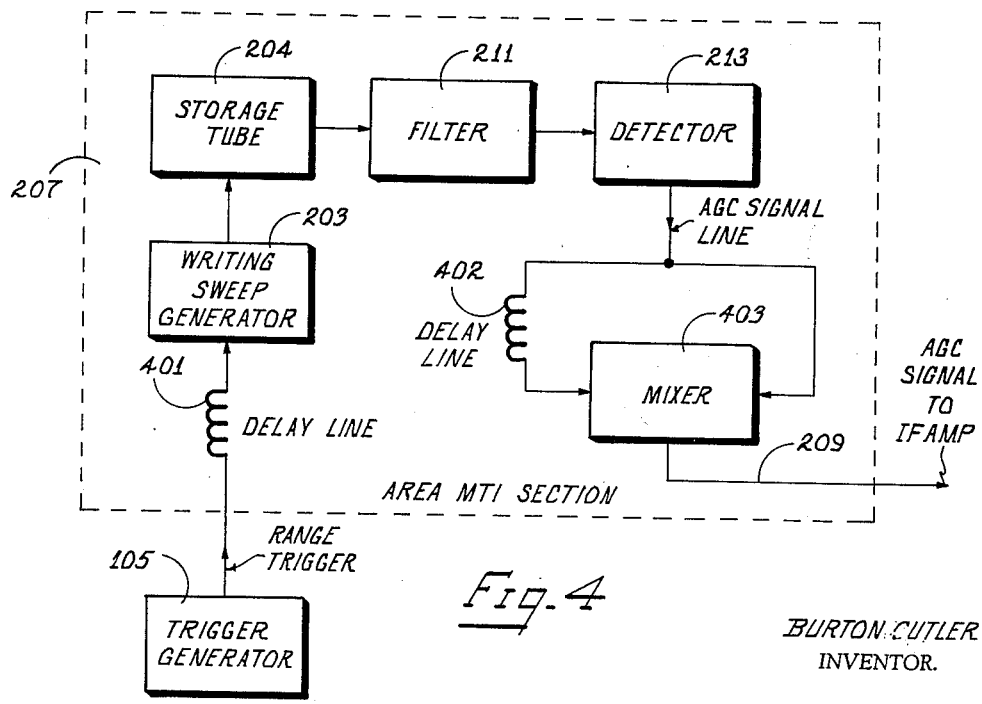
FIGURE 4 is a block diagram showing a means of advancing and elongating an AGC signal in respect to a corresponding target signal.

In FIGURE 4, a variation in the circuitry for forming the AGC signal on line 209 is shown. Depending upon the range factor per unit area over the storage tube surface, the "blur effect" discussed herein, may or may not be sufficient to produce the desired leading and trailing edge overlap of received signals by the AGC signals of FIGURE 3(b) while maintaining adequate definition. The variation shown in FIGURE 4 amounts to alternative means included in the Area MTI Section 207 whereby the AGC signal could be made to bracket the ground signal at the IF amplifier, thereby insuring that the leading and trailing edge of each ground signal or block of ground signals do not appear at the output of the IF amplifier and detector 109. The range trigger delivered by the system trigger generator 105 to the writing sweep generator is delayed a relatively small predetermined amount of time by delay line 401 which can be a manually controlled variable delay for greatest flexibility. The effect of delaying the writing sweep is obviously to make the targets written appear advanced with respect to the reading sweep. With the leading edge of the AGC signal train 308 now appearing at the IF amplifier slightly in advance of the corresponding ground signal and having a duration of approximately that of the ground target signal entering the IF amplifier, the trailing edge of a ground target signal tends to fall outside the corresponding AGC signal which would terminate before the termination of the ground target signal. Therefore, additional means must also be provided to increase the duration of the AGC signal so that the said signal can completely bracket the ground target signal. This is accomplished by the mixer 403, working in conjunction with delay line 402, in series with the AGC signal line 209. The mixer generally referred to as an "or" circuit in logic design, is basically a buffer or mixing circuit, which permits a number of gate sources of common polarity to be connected to a common load, in this case the IF amplifier. The AGC signal is made to enter two inputs of the mixer 403. One input is delayed a predetermined amount of time by delay line 402. Therefore, after the termination of the AGC signal at the undelayed input, the delayed signal input continues to appear at the delayed input, and thus it is possible to completely "bracket" any ground target signal appearing at the IF amplifier with a corresponding AGC signal.

The application of pulsed gain control, per se, is well known and well described in the literature. A very satisfactory method of applying an AGC signal to an IF amplifier stage is delineated in considerable detail in U.S. Patent 2,751,587, issued June 19, 1956, entitled "Range Gated Automatic Gain Control." The circuit configuration shown in FIGURE 4 of the said patent could be incorporated into an IF amplifier strip, resulting in a satisfactory structure for 109. The AGC signal in this particular AGC circuit (Patent 2,751,587) would be fed to the range gated video input terminal 1708A.

It should be pointed out that there is considerable variation possible in the specific instrumentation of the storage medium. In place of a dual beam storage tube such as a graphechon, a cathode ray tube and vidicon camera tube combination with optical link such as described in U.S. patent application Serial Number 593,011, filed June 15, 1956, now U.S. Patent No. 2,972,141, could be substituted. In said system, the charging or "learning" time constant is achieved both through the build-up characteristic of a conventional long persistence cathode ray tube phosphor screen and the special build-up characteristic afforded by the vidicon camera tube when operated at low space currents, as described. Of course, the writing sweep then would be applied to the cathode ray tube and the reading sweep to the camera tube.

Various other modifications and variations falling within the scope and concepts of the present invention will suggest themselves to those skilled in the art, accordingly, it is not intended that the scope of this invention be limited to the implementations shown, the description and drawings being intended to be illustrative only.

What is claimed is:

1. A system of the character described comprising the combination of: a scanning radar system including a radar pulse receiver the gain of which is controllable over the duration of, and in response to gain control pulses and having a video output; a selection circuit operating on said video output to produce selected signals by passing only signal amplitudes in excess of a predetermined threshold value; storage means scanned synchronously with said scanning radar system to store said selected signals, storage control means interposed between said selection circuit and said storage means for controlling the response rate of said storage means, said storage control means including means to alter the rate of registry of said selected signals in said storage means so that more than one successive scan interval of said scanning radar system is required to effect registry of said selected signals in said storage means; and pulse translating means connected to said storage means to transmit gain control pulses to said receiver in accordance with said selected signals stored in said storage means.

2. A system of the character described comprising the combination of: a scanning radar system including a radar pulse receiver the gain of which is controllable over the duration of and in response to gain control pulses and having a video output; a selection circuit operating on said video output to produce selected signals by passing only signal amplitudes in excess of a predetermined value; cathode-ray type storage means scanned synchronously with said scanning radar system and adapted to store said selected signals; storage control means interposed after said selection circuit for controlling the response rate of said storage means, said storage control means comprising the inherent writing signal integration characteristic of said storage means, thereby producing an effective writing time constant to control the rate of registry of said selected signals in said storage means so that more than one successive scan interval of said scanning radar system is required to produce sufficient registry of said selected signals in said storage means to permit the derivation of corresponding read-out signals; and pulse transmission means connected to said storage means and adapted to transmit said read-out signals as gain control pulses to said receiver in accordance with the degree of registry of said selected signals stored in said storage means.

3. A moving target indicating radar system comprising the combination of: a radar pulse receiver the gain of which is controllable over the duration of and in response to gain control pulses, said receiver having a video signal output; a storage means for accepting and storing said video signal output, said storage means requiring a plurality of video groups corresponding to a plurality of scan cycles to obtain substantial signal storage, said storage means therefore being relatively insensitive to any portion of said video output corresponding to a moving target echo; and pulse translating means connected to said storage means and adapted to transmit gain control pulses to said receiver in accordance with stored signals from said storage means.

4. An area moving target indicating radar system comprising the combination of: beam radiating means for radiating a beam of electromagnetic energy into space and receiving electromagnetic echo energy in return; beam scanning means for causing said beam to scan through a predetermined path in space; a radar pulse receiver connected to receive said echo energy from said beam radiating means, the gain of said receiver being controllable over the duration of, and in response to gain control pulses, and said receiver having a video output; storage means scanned in synchronism with said beam radiating means and adapted to accept and store said video output, said storage means being of a type relatively insensitive to any portion of said video output corresponding to a moving target echo and therefore not recurring in indentical position throughout successive scans; and pulse translating means connected to said storage means and adapted to transmit gain control pulses to said receiver in accordance with signals stored in said storage means.

5. A radar system including at least one scanning antenna for scanning a beam of electromagnetic energy through a volume of space and being adapted to present echo signals corresponding to objects within the scanned volume of space and to provide at least some discrimination against echo signals corresponding to stationary objects, comprising the combination of: pulsed radar transmitting means; radar receiving means for detecting portions of the energy of said transmitting means echoed by moving and stationary objects, said receiving means including pulse responsive means within the signal channel of said receiving means for controlling the gain applicable to discrete ones of said echo signals in response to contemporaneous pulsed gain control signals; storage means connected to the output of said receiving means to store said target echo signals, said storage mean being of a type which stores signal intensities as a function of the individual time integral for each of said target echo signals; and means for generating said pulsed gain control signals corresponding to and proportional to the stored intensities of the signals representative of said echo signals, thereby to effect substantially greater pulsed gain-reducing feedback in time relation with said echo signals corresponding to stationary objects than for those corresponding to moving objects.

6. The invention set forth in claim 5 further defined in that said scanning antenna includes means for developing a control signal continuously representative of its instantaneous scanning position and said storage means is of the cathode-ray type and includes storage scanning means responsive to said control signal thereby effecting scanning of said storage surface in synchronism with the scan of said antenna.

7. In a pulsed radar system including a directional antenna with means for scanning in angle, transmitting means for supplying pulses of electromagnetic energy to said antenna, and cathode ray indicating means having range and angle sweeps; the combination comprising: a radar receiver having an input connected to receive echo signals from said antenna, said receiver having an output and at least one controllable stage responsive to gain-reducing pulses whereby the gain of said receiver may be reduced during and in proportion to the amplitude of said gain-reducing pulses; cathode ray storage means having a writing input for signals to be stored, and a reading output for reading stored signals; means for supplying signals from said receiver output to said writing input, said means being connected so as to pass only signals above a predetermined threshold level; means synchronized with said indicating means sweeps, said antenna angular scan, and said transmitted pulses for causing angle and range sweeps of said cathode ray storage means in synchronism with corresponding range and angle sweeps of said indicating means; means for predetermining the learning time constant of said storage means whereby more than one successive occurrence of said signals from said receiver output at said writing input at a particular range and angle position is required to effect storage and thereby to produce corresponding signals at said reading output; and means responsive to signals at said reading output to produce and apply said gain-reducing pulses to said receiver controllable stage.

8. The invention set forth in claim 7 further defined in that said cathode ray storage means includes a scanned charge pattern storage surface, and said means for predetermining the learning time constant of said storage means includes the charge pattern storage surface itself with its inherent time and intensity integration characteristic.

9. A system of the character described comprising the combination of: a radar pulse receiver the gain of which is controllable over the duration of, and in response to gain control pulses, said receiver having a video output; a selection circuit operating on said video output to produce selected signals by passing only signal amplitudes within said video output in excess of a predetermined value; storage means for storing said selected signals; storage control means interposed between said selection circuit and said storage means for controlling the response rate of said storage means; and pulse translating means connected to said storage means to generate and transmit gain control pulses corresponding in occurrence and duration to said stored selected signals to said receiver.

10. The invention set forth in claim 9 in which said storage control means includes means to control the learning time of said storage means in a manner such that a plurality of occurrences of any given signal at the same range and angle on successive scans are necessary for storage of said signal.

References Cited by the Examiner
UNITED STATES PATENTS

| | | | |
|---|---|---|---|
| 2,956,274 | 10/60 | Smythe | 343—7.7 |
| 2,986,673 | 5/61 | Schagen et al. | 343—7.7 |
| 2,989,742 | 6/61 | Johnson et al. | 343—7.7 |
| 3,051,947 | 8/62 | Engel | 343—7.7 |

CHESTER L. JUSTUS, *Primary Examiner.*

FREDERICK M. STRADER, *Examiner.*